United States Patent
Takagishi et al.

(10) Patent No.: US 7,277,262 B2
(45) Date of Patent: Oct. 2, 2007

(54) CPP MAGNETORESISTIVE HEAD INCLUDING A PAIR OF SHIELDS AND A SENSE CURRENT PREAMPLIFIER

(75) Inventors: Masayuki Takagishi, Kunitachi (JP); Tomomi Funayama, Hino (JP); Yoichiro Tanaka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 433 days.

(21) Appl. No.: 10/932,338

(22) Filed: Sep. 2, 2004

(65) Prior Publication Data
US 2005/0063104 A1 Mar. 24, 2005

(30) Foreign Application Priority Data
Sep. 2, 2003 (JP) ............... 2003-310275

(51) Int. Cl.
*G11B 5/39* (2006.01)
(52) U.S. Cl. .................. 360/324.2; 360/324.1
(58) Field of Classification Search ............ 360/324.1, 360/324.2
See application file for complete search history.

(56) References Cited

U.S. PATENT DOCUMENTS

| | | | |
|---|---|---|---|
| 5,668,688 A | 9/1997 | Dykes et al. | |
| 5,790,352 A | 8/1998 | Cunningham | |
| 5,898,548 A | 4/1999 | Dill et al. | |
| 6,686,068 B2 * | 2/2004 | Carey et al. | 428/811.3 |
| 6,937,447 B2 * | 8/2005 | Okuno et al. | 360/324.1 |
| 6,954,321 B2 * | 10/2005 | Freitas et al. | 360/46 |
| 6,956,707 B2 * | 10/2005 | Ottesen et al. | 360/25 |
| 6,992,864 B2 * | 1/2006 | Kaneko et al. | 360/264.2 |
| 7,035,062 B1 * | 4/2006 | Mao et al. | 360/324.2 |
| 7,038,893 B2 * | 5/2006 | Koui et al. | 360/324.2 |
| 7,068,479 B2 * | 6/2006 | Sato et al. | 360/324.12 |
| 2002/0163764 A1 * | 11/2002 | Nakazawa et al. | 360/324.2 |
| 2004/0201929 A1 * | 10/2004 | Hashimoto et al. | 360/324.1 |
| 2004/0201930 A1 * | 10/2004 | Yoshikawa et al. | 360/324.1 |
| 2004/0252551 A1 * | 12/2004 | Iwata et al. | 365/158 |
| 2005/0077890 A1 * | 4/2005 | Rannow et al. | 324/117 R |
| 2005/0116721 A1 * | 6/2005 | Naka | 324/525 |
| 2005/0129090 A1 * | 6/2005 | Sheperek et al. | 374/185 |

FOREIGN PATENT DOCUMENTS

| | | |
|---|---|---|
| JP | 61-230614 | 10/1986 |
| JP | 10-55512 | 2/1998 |

OTHER PUBLICATIONS

Austrian Search Report dated Dec. 30, 2005 for Singapore Appln. No. 200404674-4.
Chinese Office Action dated Dec. 9, 2005 for Appln. No. 2004100686830.

* cited by examiner

*Primary Examiner*—Jefferson Evans
(74) *Attorney, Agent, or Firm*—Pillsbury Winthrop Shaw Pittman, LLP (57) ABSTRACT

A magnetic recording/reproducing apparatus has a magnetoresistive head having a magnetoresistive film through which a current is flowed in a direction substantially perpendicular to a film plane and a pair of magnetic shields disposed to sandwich the magnetoresistive film, and a preamplifier which supplies a sense current to the magnetoresistive head in constant-current driving.

5 Claims, 7 Drawing Sheets

CPP MAGNETORESISTIVE HEAD INCLUDING A PAIR OF SHIELDS AND A SENSE CURRENT PREAMPLIFIER

CROSS-REFERENCE TO RELATED APPLICATIONS

This application is based upon and claims the benefit of priority from prior Japanese Patent Application No. 2003-310275, filed Sep. 2, 2003, the entire contents of which are incorporated herein by reference.

BACKGROUND OF THE INVENTION

1. Field of the Invention

The present invention relates to a magnetic recording/reproducing apparatus using a current-perpendicular-to-plain magnetoresistive head.

2. Description of the Related Art

An increase in recording density is always required in a magnetic recording/reproducing apparatus. Accordingly, a high-sensitive read head is required. As an element for a read head that satisfies such requirements, a tunneling magnetoresistive element (TMR element) or a current-perpendicular-to-plain giant magnetoresistive element (CPP-GMR element) are known.

In a read head using such an element, a sense current for magnetic field detection is flowed through a TMR film or a GMR film, having a stacked structure of a magnetization pinned layer, a spacer layer and a magnetization free layer, in a direction substantially perpendicular to the film plane. For this reason, the read head can be called a current-perpendicular-to-plain magnetoresistive head. Examples of documents that disclose a magnetic head using a TMR element include, for example, U.S. Pat. No. 5,898,548. Examples of documents that disclose a magnetic head using a CPP-GMR element include, for example, Jpn. Pat. Appln. KOKAI Publication No. 10-55512 and U.S. Pat. No. 5,668,688.

When a sense current is flowed through a read head element, use of constant-current driving or constant-voltage driving is determined depending on various conditions. For example, it is known that the constant-voltage driving is preferred for a read head using a TMR element in order to absorb fluctuation in element resistance.

The spacer layer in the TMR film or the GMR film, having the stacked structure of the magnetization pinned layer, the spacer layer and the magnetization free layer described above, has a structure in which fine conductive regions (referred to as pin holes or metal holes) are distributed in a high-resistance matrix. The reason why the spacer layer having such a structure is employed is to control the resistance of the spacer layer. The resistance of a high-resistance tunnel barrier layer as the spacer layer in the TMR element must be suppressed in consideration of practical use as a read head. The fine conductive regions in the tunnel barrier layer contribute to the decrease in resistance (see, for example, U.S. Pat. No. 5,898,548, and IEEE Trans. Magn., Vol. 38, 2002, p. 73). In a CPP-GMR element, a high-resistance thin oxide film including fine metal holes is used as the spacer layer so as to improve an MR ratio.

However, it has been found that these current-perpendicular-to-plain magnetoresistive heads may be deteriorated mainly due to heat generated by sense current concentrated on the fine conductive regions distributed in the spacer layer, resulting in shortened life-time thereof, which brings about a problem of lower reliability of a magnetic recording/reproducing apparatus.

BRIEF SUMMARY OF THE INVENTION

A magnetic recording/reproducing apparatus according to one aspect of the present invention comprises: a magnetoresistive head having a magnetoresistive film through which a current is flowed in a direction substantially perpendicular to a film plane and a pair of magnetic shields disposed to sandwich the magnetoresistive film; and a preamplifier which supplies a sense current to the magnetoresistive head in constant-current driving.

DETAILED DESCRIPTION OF THE INVENTION

Embodiments of the present invention will be described below with reference to the accompanying drawings.

Figure 1:
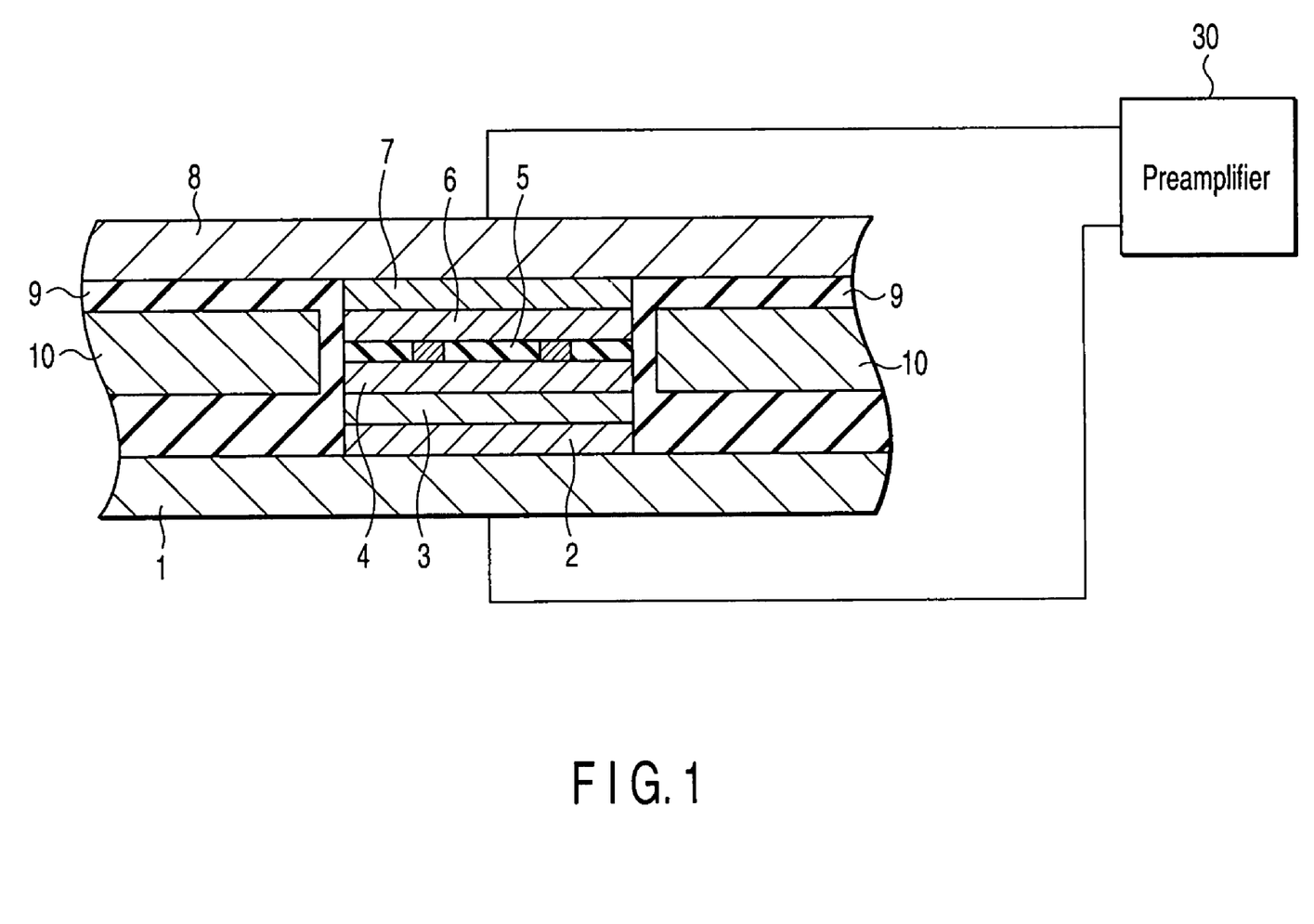
FIG. 1 is a diagram showing a magnetoresistive film and a preamplifier in constant-current driving connected to the magnetoresistive film according to an embodiment of the present invention.

FIG. 1 is a sectional view showing an example of current-perpendicular-to-plain magnetoresistive element used in the present invention. FIG. 1 shows the air-bearing surface side of the magnetoresistive element opposing a magnetic recording medium (not shown). As shown in FIG. 1, an lower shield 1, an underlayer 2, an antiferromagnetic layer 3, a magnetization pinned layer (pinned layer) 4, a high-resistance spacer layer 5, a magnetization free layer (free layer) 6, a protective layer 7, and an upper shield 8 are stacked. The antiferromagnetic layer 3, the pinned layer 4, the high-resistance spacer layer 5, the free layer 6 constitute a magnetoresistive film (TMR film or CPP-GMR film). Biasing ferromagnetic layers 10 for stabilizing magnetic domains in the free layer 6 are formed on both sides of the magnetoresistive film with intervening insulating layers 9.

The lower shield 1 and the upper shield 8 also serve as electrodes to flow a sense current in a direction substantially perpendicular to the film plane of the magnetoresistive film. A material used for the lower shield 1 and the upper shield 8 includes a conductive ferromagnetic material such as NiFe. The antiferromagnetic layer 3 has a function of pinning the magnetization of the pinned layer 4. A material used for the antiferromagnetic layer 3 includes, for example, PtMn. The free layer 6 serves as a sensing area. When a sense current is flowed in a direction substantially perpendicular to the film plane of the magnetoresistive element, electric signals can be output for magnetic signals sensed by the free layer 6.

In the present invention, a preamplifier 30 to supply a sense current in constant-current driving is connected to the lower shield 1 and the upper shield 8. An effect achieved by constant-current driving will be described below. Here, the effect by the constant-current driving specifically may be exerted on the high-resistance spacer layer 5 included in the magnetoresistive film. For this reason, the high-resistance spacer layer 5 will be described first.

Figure 2:
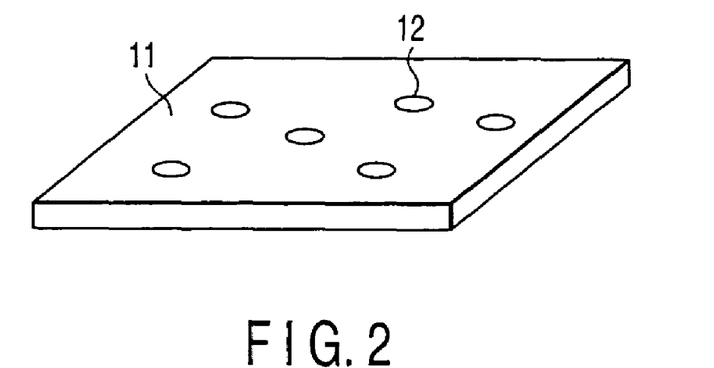
FIG. 2 is a perspective view schematically showing an example of a high-resistance spacer layer included in the magnetoresistive film.
Figure 3:
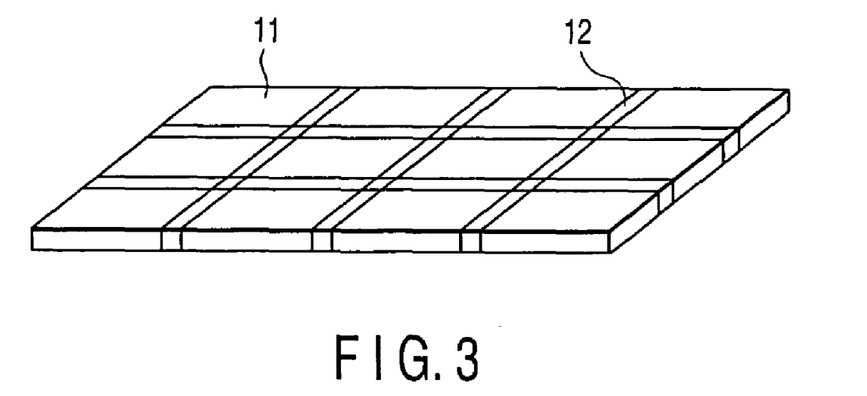
FIG. 3 is a perspective view schematically showing another example of the high-resistance spacer layer included in the magnetoresistive film.
Figure 4:
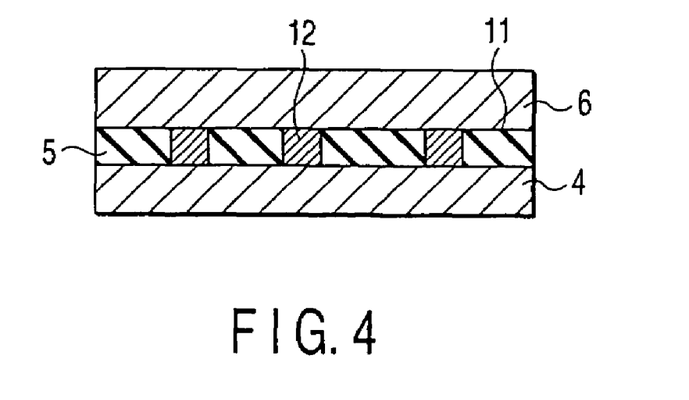
FIG. 4 is a sectional view showing an example of a pinned layer, a high-resistance spacer layer and a free layer.

As shown in FIG. 2 or 3, the high-resistance spacer layer 5 has a structure that fine conductive regions 12 are formed in a high-resistance matrix 11. The configuration of the conductive regions 12 may be one-dimensional holes (referred to as conductive holes) shown in FIG. 2 or two-dimensional grooves shown in FIG. 3. In any case, the section including the pinned layer 4, the high-resistance spacer layer 5 and the free layer 6 is as shown in FIG. 4.

In the TMR film, a high-resistance spacer layer (tunnel barrier layer) 5 having the above structure is formed depending on manufacturing methods. In the CPP-GMR film, the high-resistance spacer layer 5 having the structure is intentionally formed to increase an output. In the CPP-GMR film, the conductive regions 12 are formed to obtain a current confinement effect. In this case, if the area of the conductive regions 12 is about 10% or less of the film area (element area), the current confinement effect remarkably appears.

The high-resistance matrix 11 contains, as a main component, oxide, nitride or carbide of any element selected from the group consisting of boron (B), silicon (Si), germanium (Ge), tantalum (Ta), tungsten (W), niobium (Nb), aluminum (Al), molybdenum (Mo), phosphorous (P), vanadium (V), arsenic (As), antimony (Sb), zirconium (Zr), titanium (Ti), zinc (Zn), lead (Pb), thorium (Th), beryllium (Be), cadmium (Cd), scandium (Sc), lanthanum (La), yttrium (Y), praseodymium (Pr), chromium (Cr), tin (Sn), gallium (Ga), indium (In), rhodium (Rh), palladium (Pd), magnesium (Mg), lithium (Li), barium (Ba), calcium (Ca), strontium (Sr), manganese (Mn), iron (Fe), cobalt (Co), nickel (Ni), rubidium (Rb), and rare-earth metal, and has a resistivity of about $1\times10E-3$ $\Omega$cm or more. A material used for the conductive regions 12 includes metal such as copper (Cu), gold (Au), silver (Ag), platinum (Pt), palladium (Pd), iridium (Ir), osmium (Os), iron (Fe), cobalt (Co) and nickel (Ni).

If the size of the conductive region 12 in the form of the one-dimensional hole (conductive hole) shown in FIG. 2 is about 0.1 to 10 nm, the function of the CPP-GMR film or the TMR film can be achieved, and element functions can be more improved. The conductive region 12 in the form the two-dimensional groove shown in FIG. 3 may have a groove width of 0.1 to 5 nm.

Figure 5:
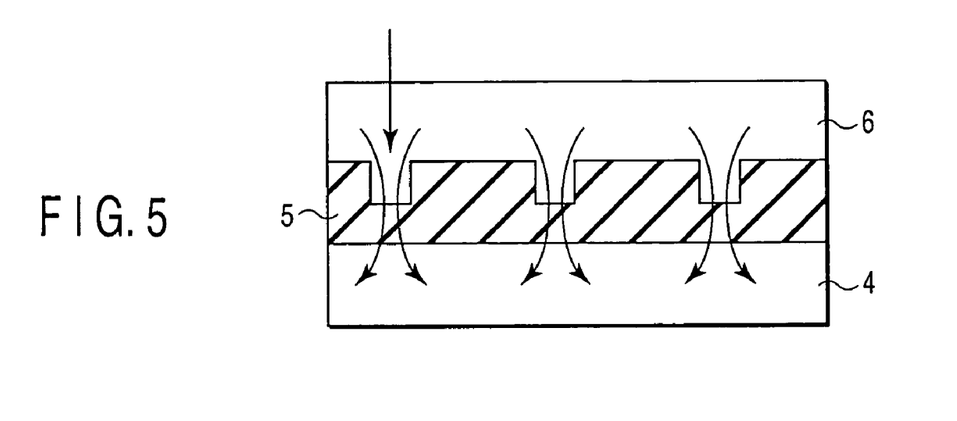
FIG. 5 is a sectional view showing another example of the pinned layer, the high-resistance spacer layer and the free layer.

The high-resistance spacer layer 5 may not always include the conductive region 12 extending from the pinned layer 4 to the free layer 6. For example, as shown in FIG. 5, if the high-resistance spacer layer 5 has an uneven surface in which the thickness of the projecting portions is 0.2 to 4 nm and the thickness of the recessed portions is half or less the thickness of the projecting portions, a tunnel current is flowed through the recessed portions, or a current is concentrated on the recessed portions due to resistance difference to achieve a current confinement effect. In other words, the recessed portions shown in FIG. 5 perform the same role as the conductive regions 12 in the form of the holes (conductive holes) shown in FIG. 4.

Figure 6A:
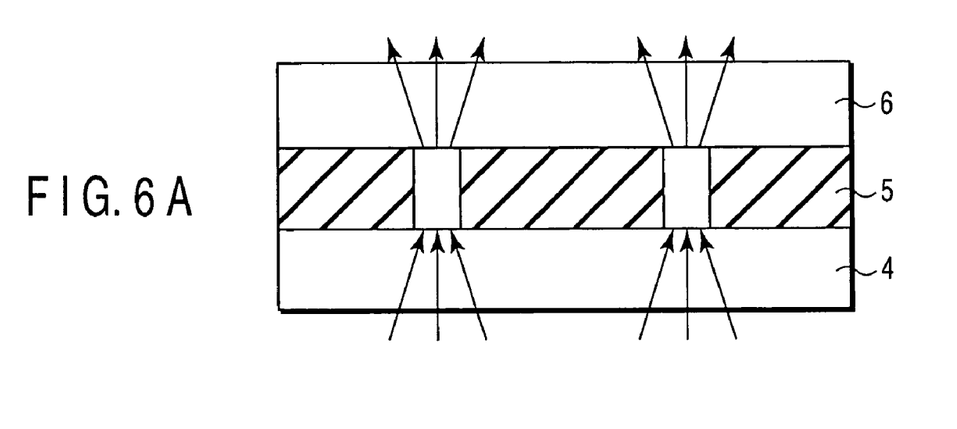
FIGS. 6A and 6B are diagrams for explaining a problem caused when a sense current is flowed through the current-perpendicular-to-plain magnetoresistive head.
Figure 6B:
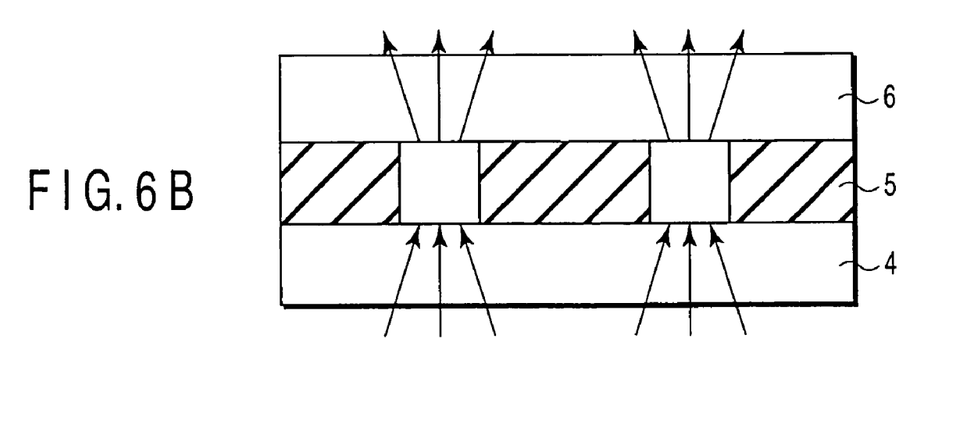

A problem caused when a sense current is flowed through the above current-perpendicular-to-plain magnetoresistive head will be described below with reference to FIGS. 6A and 6B. FIGS. 6A and 6B show a state that, in the stacked structure of the pinned layer 4, the high-resistance spacer layer 5 and the free layer 6, the sense current is locally flowed in the fine conductive regions 12 distributed in the high-resistance spacer layer 5. When the sense current is concentrated on the conductive regions 12 in such a manner, a high-resistance portion around the conductive regions 12 changes due to heat generation (Joule heat), so that the area of the conductive regions 12 becomes larger as shown in FIG. 6B than in FIG. 6A. In this case, shunt components are increased in the TMR element, or current confinement is made weak in the CPP-GMR element, resulting in output drop. The occurrence of the output drop increases an error rate of the magnetic recording/reproducing apparatus incorporating the above magnetoresistive head and shortens the lifetime the apparatus.

In the present invention, constant-current driving is employed to considerably suppress a reduction in lifetime of a magnetic recording/reproducing apparatus caused by the aforementioned output drop.

Figure 7:
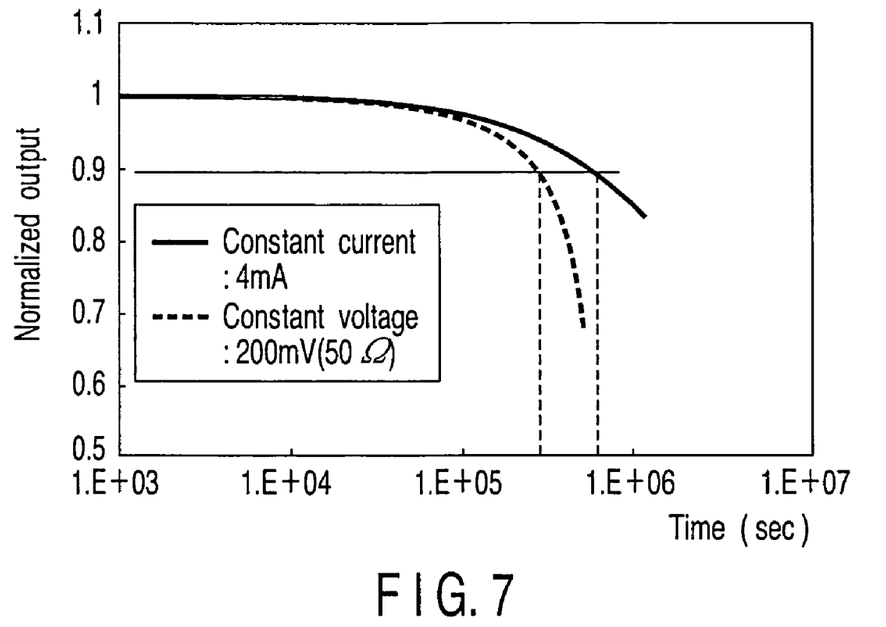
FIG. 7 is a graph showing output changes with time when the current-perpendicular-to-plain magnetoresistive head is operated in constant-current driving or in constant-voltage driving.

FIG. 7 shows output changes with time when the current-perpendicular-to-plain magnetoresistive head is operated in constant-current driving or in constant-voltage driving. The resistance of the head used in the experiments is 50 $\Omega$. The value of an output at time 0 for constant-current driving is substantially equal to that for constant-voltage driving. Here, the output drop corresponding to the limit of the error rate of the magnetic recording/reproducing apparatus using the head is assumed to be 10%. As shown in FIG. 7, the lifetime of the head operated in constant-current driving is about twice the lifetime of the head operated in constant-voltage driving.

Although this is apparently inconsistent with the concept of constant-voltage driving in which the entire voltage does not drop even when the resistance is decreased, it is believed to be effected by the following mechanism. That is, when the magnetic recording/reproducing apparatus is operated in constant-voltage driving, the Joule heat W generated in the conductive region 12 is in inverse proportion to the resistance R of the conductive region as described in the following expression:

$$W \text{ (in constant-voltage driving)} \propto V^2/R.$$

In this case, if the size of the conductive region 12 is enlarged after a long-time operation, the resistance R is decreased and thus the Joule heat W is increased. Therefore, when the magnetic recording/reproducing apparatus is operated in constant-voltage driving, the enlargement of the conductive region 12 is accelerated, and the lifetime of the magnetic recording/reproducing apparatus becomes short.

On the other hand, the Joule heat W generated when the current-perpendicular-to-plain magnetoresistive head is operated in constant-current driving is in proportion to the resistance R of the conductive region as described in the following expression. Therefore, when the magnetic recording/reproducing device is operated in constant-current-driven, the enlargement of the conductive region 12 is not accelerated, so that the lifetime of the magnetic recording/reproducing device is prevented from being shortened:

$$W \text{ (in constant-current driving)} \propto I^2 \times R.$$

Figure 8:
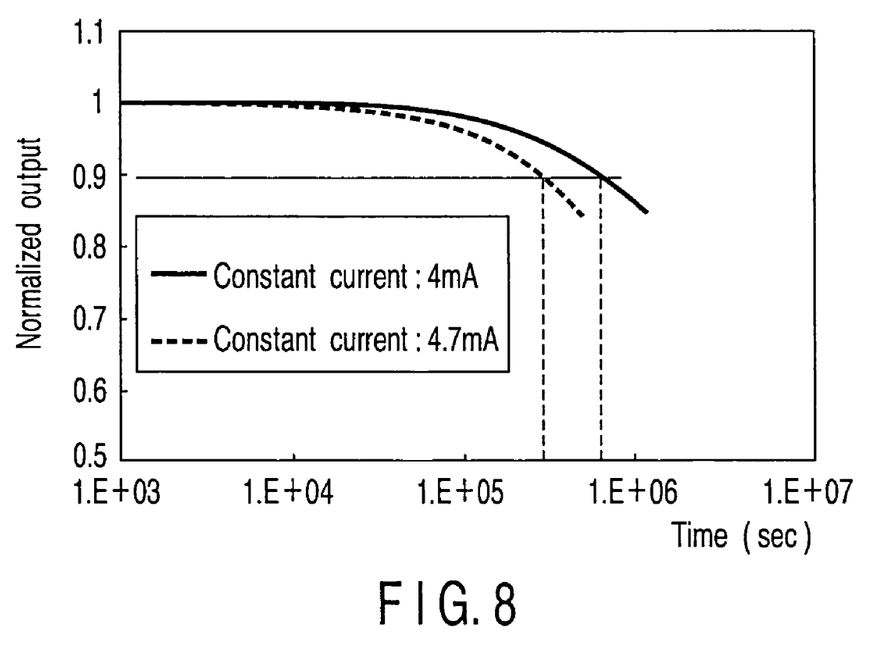
FIG. 8 is a graph showing output changes with time when the current-perpendicular-to-plain magnetoresistive head is operated in constant-current driving with different current values.

FIG. 8 shows an output curve with time when a driving current is increased by about 20% in constant-current driving. When a current is increased by 20% in constant-current driving, the lifetime of the magnetic recording/reproducing apparatus is substantially equal to the lifetime obtained when the magnetic recording/reproducing apparatus is operated in constant-voltage driving as shown in FIG. 7. Therefore, an output gain obtained by employing constant-current driving under the above conditions can be approximated to about 20%.

As described above, in the present invention, when the current-perpendicular-to-plain magnetoresistive head is operated in constant-current driving, the lifetime can be considerably extended, or the output can be considerably increased.

In the present invention, base on measurement of the temperature of the current-confinement portion (high-resistance spacer layer), the preamplifier can be feedback controlled to lower the current value where the temperature is raised to an extent to cause deterioration. In the case where such a mechanism is provided, more excellent effect than that obtained in the simple constant-current driving can be obtained.

Figure 9:
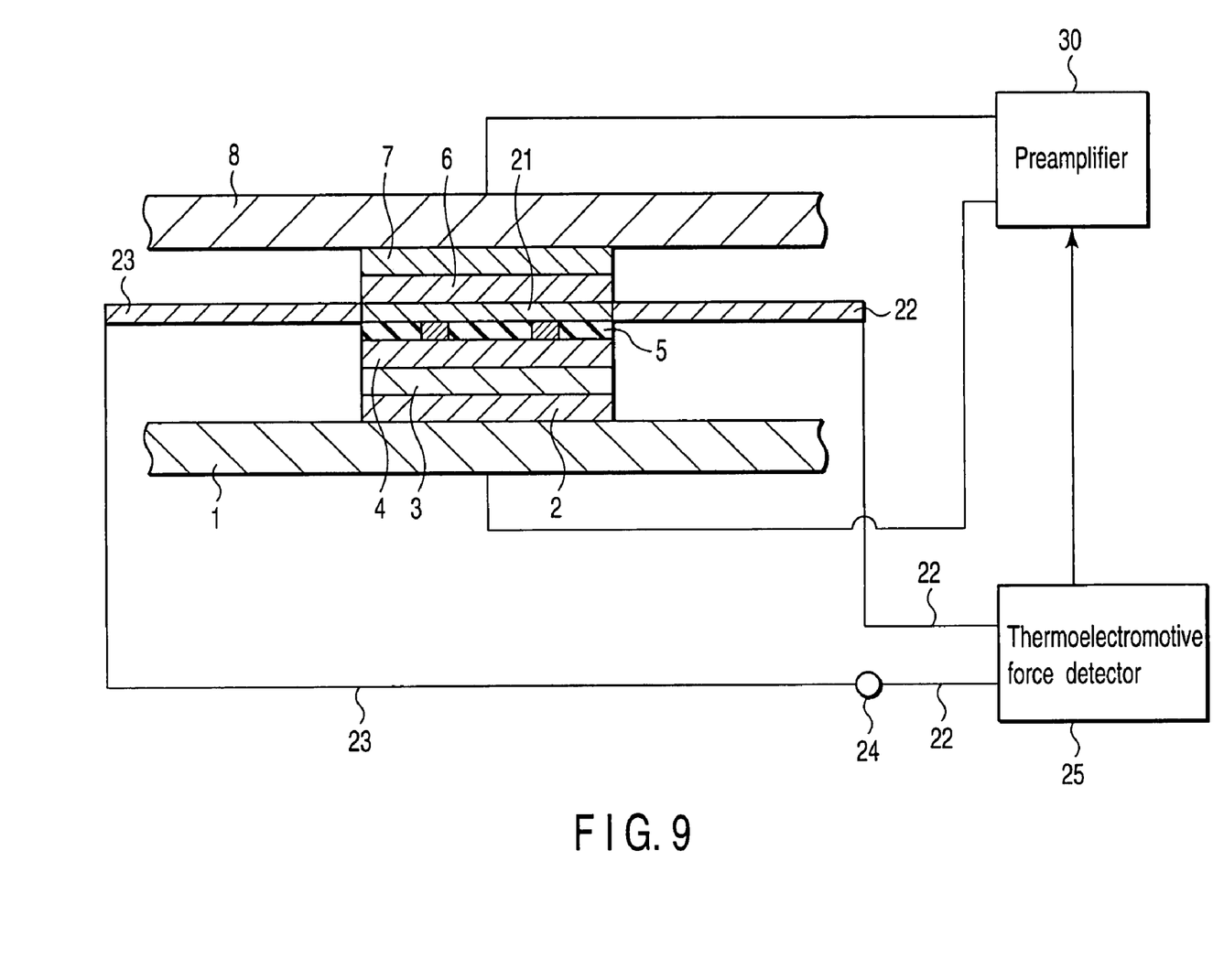
FIG. 9 is a diagram showing a magnetoresistive film in which a temperature measuring element is incorporated, and a thermo-electromotive force detector and a preamplifier in constant-current driving connected to the magnetoresistive film according to another embodiment of the present invention.

The constitution of the magnetic recording/reproducing apparatus having such a mechanism will be described below with reference to FIG. 9. In the current-perpendicular-to-plain magnetoresistive element, a Cu layer 21 is inserted between the high-resistance spacer layer 5 and the free layer 6 in the stacked structure shown in FIG. 1. Even when the Cu layer 21 is inserted, the TMR effect or the GMR effect is not disturbed. A Cu lead 22 is connected to one end of the Cu layer 21, and a CuNi (constantan) lead 23 is connected to the other end. In addition, the Cu lead 22 and the CuNi (constantan) lead 23 are connected to a reference junction 24 set at room temperature. Since this constitution generates thermo-electromotive force between Cu and CuNi, the temperature of the high-resistance spacer layer 5 can be measured with a thermo-electromotive force detector 25 connected in the middle of the Cu lead 22. Therefore, the preamplifier 30 operated in constant-current driving can be feedback controlled so as to lower the value of the sense current, based on the temperature of the high-resistance spacer layer 5 measured with the thermo-electromotive force detector (controller) 25.

Figure 10:
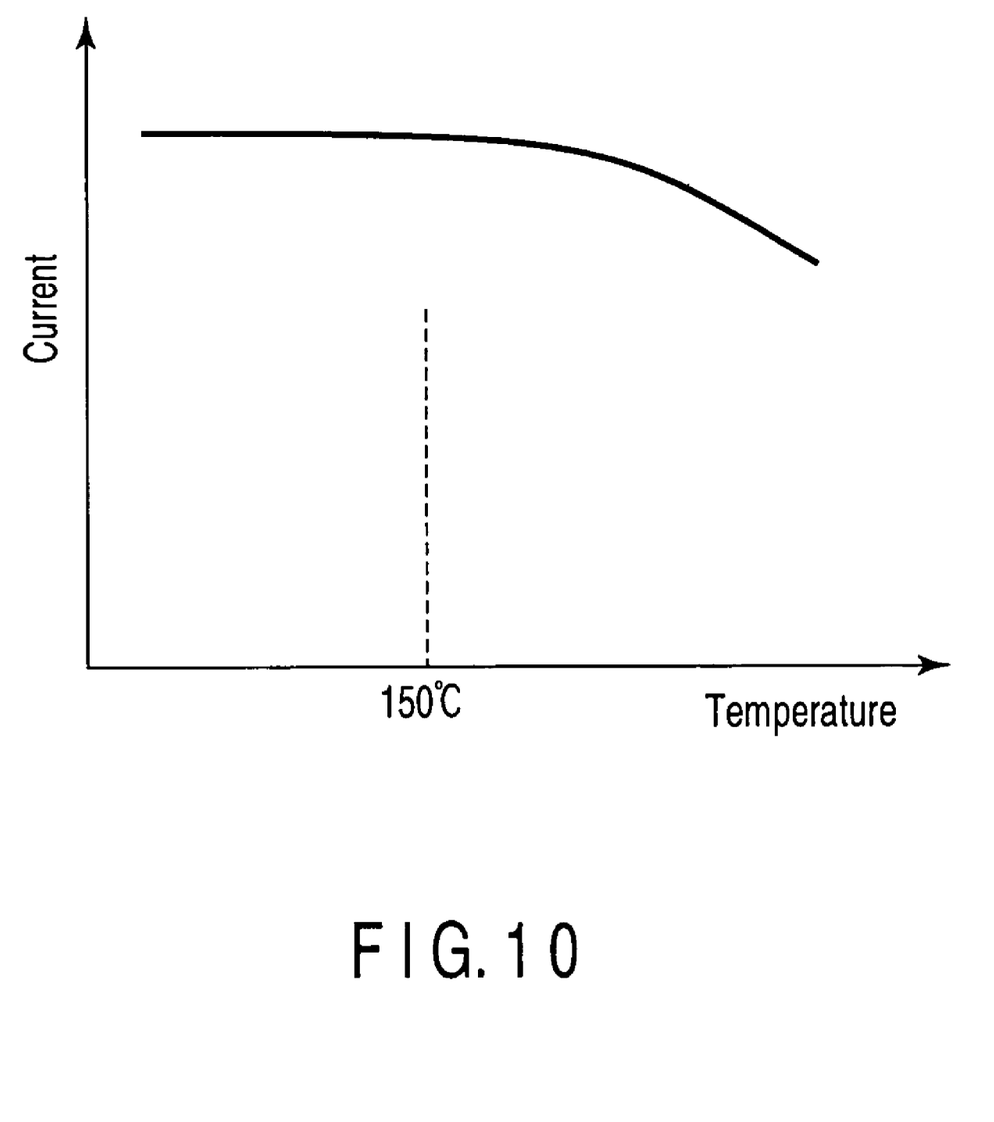
FIG. 10 is a graph showing a relationship between a temperature and a current controlled in the magnetoresistive film in FIG. 9.

For example, in FIG. 10, the preamplifier 30 operated in constant-current driving is controlled so as to lower the value of the sense current, when the temperature of the high-resistance spacer layer 5 measured with the thermo-electromotive force detector 25 exceeds 150° C.

Incidentally, the junction between Cu and CuNi (constantan) serving as a heat sensing portion may be separated from the element, and the preamplifier 30 operated in constant-current driving may be controlled so as to change the value of the sense current based on the ambient temperature near the element.

Next, a magnetic head assembly and a magnetic recording/reproducing apparatus using a magnetoresistive head according to an embodiment of the present invention will be described below.

Figure 11:
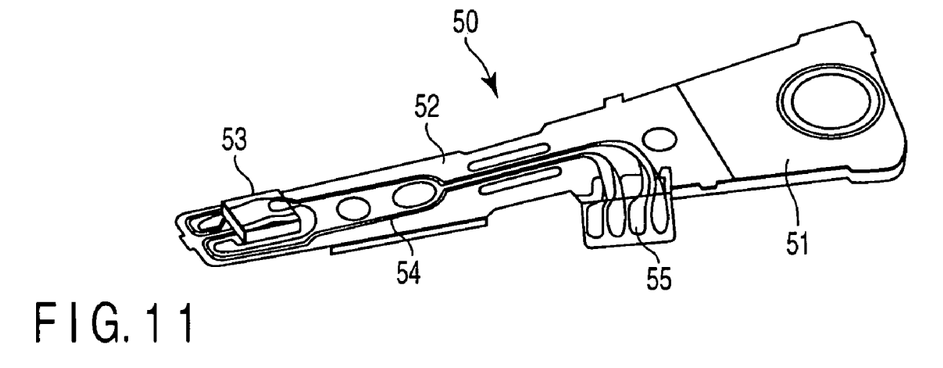
FIG. 11 is a perspective view showing a magnetic head assembly, viewed from a disk, according to an embodiment of the present invention.

FIG. 11 is a perspective view showing a magnetic head assembly 50, viewed from a disk, using a current-perpendicular-to-plain magnetoresistive head according to an embodiment of the present invention. The actuator arm 51 has a hole to be fitted on a pivot in a magnetic disk apparatus. The suspension 52 is fixed to one end of the actuator arm 51. The head slider 53 on which the current-perpendicular-to-plain magnetoresistive head is mounted is supported on the distal end of the suspension 52. The lead wires 54 for writing and reading signals are formed on the suspension 52. One ends of the lead wires 54 are connected to electrodes of the magnetic head, and the other ends of the lead wires 54 are connected to electrode pads 55.

Figure 12:
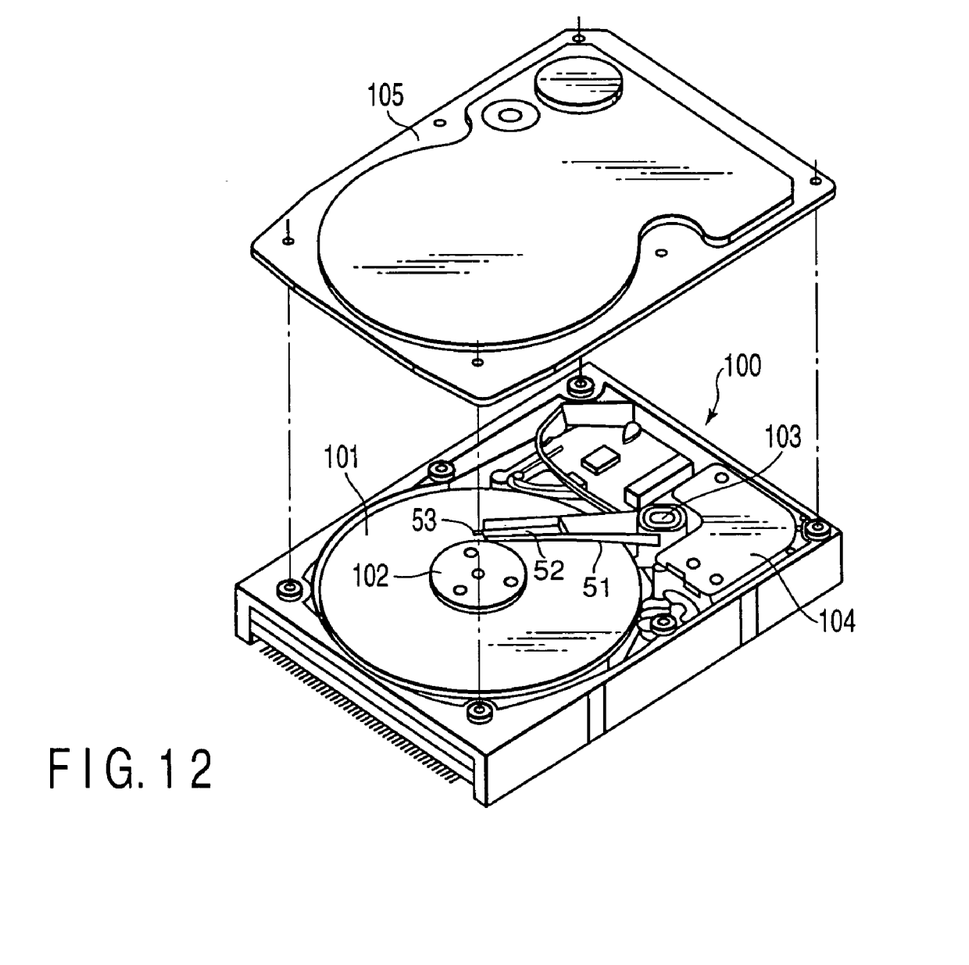
FIG. 12 is a perspective view showing the internal structure of a magnetic recording/reproducing apparatus on which the magnetic head assembly shown in FIG. 11 is mounted.

FIG. 12 is a perspective view showing the internal structure of a magnetic recording apparatus (hard disk drive) 100 in which the magnetic head assembly shown in FIG. 11 is installed. The magnetic disk 101 is fixed on the spindle 102, and is rotated in response to control signals supplied from drive controller (not shown). The actuator arm 51 shown in FIG. 11 is fitted to the pivot 103 and supported with ball bearings (not shown) arranged at upper and lower positions of the pivot 103, and the actuator arm 51 supports the suspension 52 and the magnetic head slider 53 arranged at the distal end of the suspension 52. The voice coil motor 104, a type of a linear motor, is arranged at the proximal end of the actuator arm 51. The voice coil motor 104 comprises a magnetic circuit constituted by a driving coil wound around a bobbin unit, and a permanent magnet and a counter yoke that are arranged opposite each other to sandwich the coil. The actuator arm 51 can be freely actuated with the voice coil motor 104. When the magnetic disk 101 is rotated, the magnetic head slider 53 is held such that the magnetic head slider 53 is floated over the magnetic disk 101 or is in contact with the surface of the magnetic disk 101, so that information can be written or read by means of the magnetic head. The cover 105 is put on the housing that stores these components.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording/reproducing apparatus comprising:
   a magnetoresistive head comprising:
      a magnetoresistive film through which a current is flowed in a direction substantially perpendicular to a film plane, the magnetoresistive film having a stacked structure of a magnetization pinned layer, a high-resistance spacer layer including a high-resistance matrix and conductive regions formed therein, and a magnetization free layer; and
a pair of magnetic shields disposed to sandwich the magnetoresistive film;
a preamplifier which supplies a sense current to the magnetoresistive head in constant-current driving;
a temperature measuring element measuring a temperature of the high-resistance spacer layer included in the magnetoresistive film; and
a controller controlling a value of the sense current supplied by the preamplifier based on data of the temperature measuring element.

2. The apparatus according to claim 1, wherein the high-resistance matrix is selected from the group consisting of metal oxide, metal nitride and metal carbide, and the conductive regions contain a metal selected from the group consisting of copper, gold and silver.

3. The apparatus according to claim 1, wherein an area ratio of the conductive regions is 10% or less of an area of the spacer layer.

4. The apparatus according to claim 1, wherein the high-resistance spacer layer is a tunnel barrier layer.

5. The apparatus according to claim 1, wherein the temperature measuring element includes a conductive layer of a first metal stacked on the high-resistance spacer layer of the magnetoresistive film and a lead of a second metal, the conductive layer and the lead forming a junction so as to generate thermo-electromotive force.

* * * * *